United States Patent [19]

Morrison

[11] 4,107,477
[45] Aug. 15, 1978

[54] MULTI-SUBSCRIBER TELEPHONE APPARATUS

[75] Inventor: Howard J. Morrison, Deerfield, Ill.

[73] Assignee: Marvin Glass & Associates, Chicago, Ill.

[21] Appl. No.: 775,786

[22] Filed: Mar. 9, 1977

[51] Int. Cl.² .............................................. H04M 1/02
[52] U.S. Cl. ...................................... 179/99; 179/101;
179/100 R; 179/182 A
[58] Field of Search ............. 179/1 CN, 1 HF, 1 MN,
179/1 PC, 1 C, 2 C, 18 BC, 81 R, 99, 100,
101–103, 152, 159, 176, 177, 179, 182

[56] References Cited

U.S. PATENT DOCUMENTS

| 2,874,229 | 2/1959 | Lilley .................................... 179/179 |
| 3,022,387 | 2/1962 | Bair ..................................... 179/182 A |
| 3,331,924 | 7/1967 | Reaves ............................... 179/1 CN |
| 3,427,407 | 2/1969 | Heck et al. ............................. 179/99 |
| 3,435,151 | 3/1969 | Russell .............................. 179/1 CN |

FOREIGN PATENT DOCUMENTS

| 1,142,915 | 1/1963 | Fed. Rep. of Germany ........ 179/84 R |
| 235,673 | 12/1944 | Switzerland ......................... 179/100 D |
| 212,297 | 11/1940 | Switzerland ......................... 179/100 R |

*Primary Examiner*—Kathleen H. Claffy
*Assistant Examiner*—Gerald L. Brigance
*Attorney, Agent, or Firm*—Mason, Kolehmainen, Rathburn & Wyss

[57] ABSTRACT

Station apparatus is provided which includes a common signalling unit and two or more handsets for operation on one telephone line or in a multiline arrangement. The handsets are connected to a single telephone line in a one line arrangement and are independently switched to any one of the telephone lines in a multiline arrangement so that the subscribers may each talk on separate lines or simultaneously on any one of the lines. Similarly, in the multiline arrangement the signalling unit is selectively connectable to each of the lines to allow dialing or signalling on any of the lines regardless of the busy or in-use condition of the other lines.

The selective switching arrangements provided for the handsets and the common signalling unit in the multiline arrangement are assembled in a common housing or base with the selective switching and common signalling circuitry located in a central raised portion of the base. In a two handset apparatus, the handsets are positioned on either side of the common apparatus. The common base portion is molded to form a retaining cradle for and interfit with the two handsets forming a smooth contoured outer surface when the handsets are in position.

23 Claims, 3 Drawing Figures

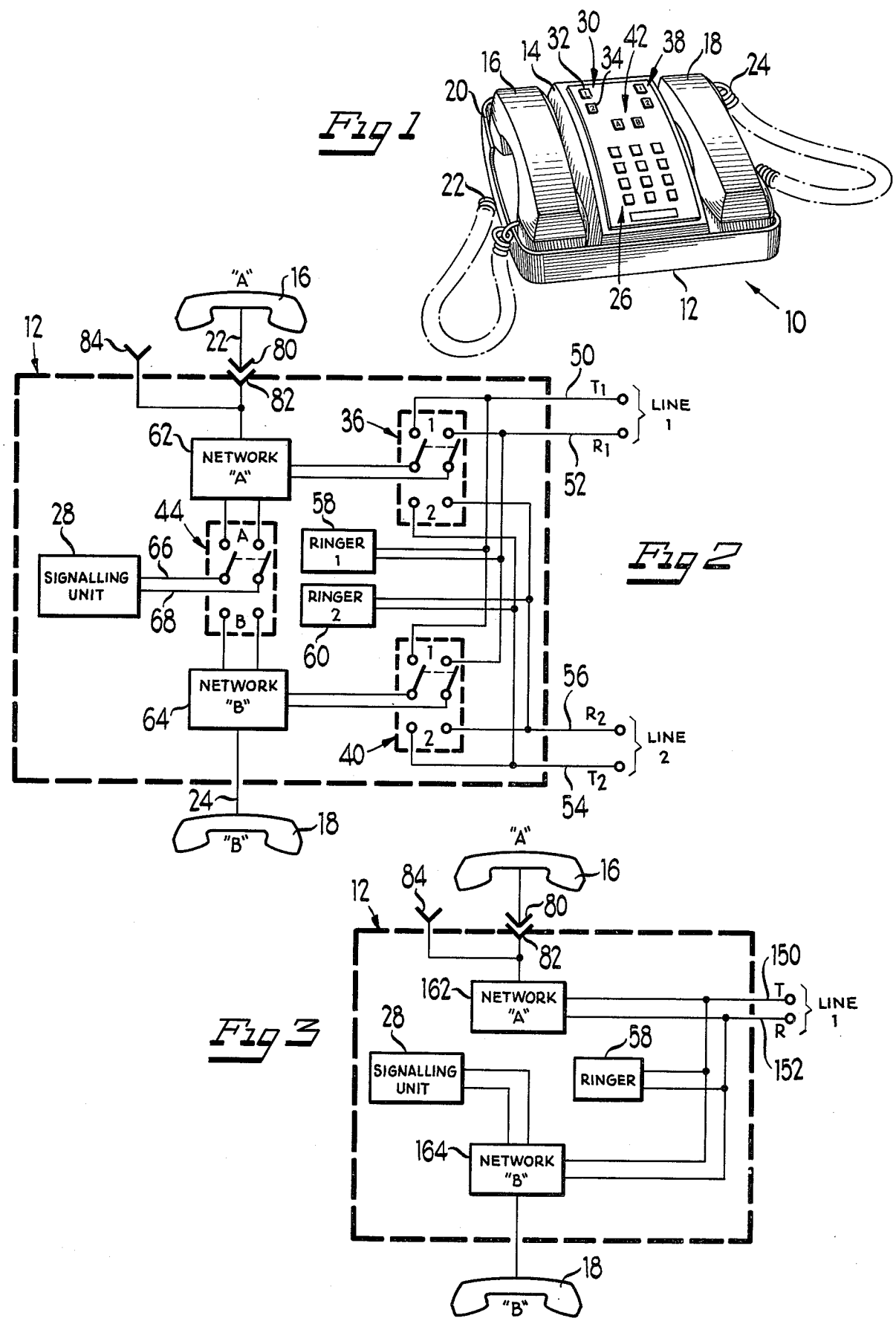

MULTI-SUBSCRIBER TELEPHONE APPARATUS

BACKGROUND OF THE INVENTION

A. Field of the Invention

The present invention relates generally to the field of subscriber station apparatus and, more particularly, to new and improved station apparatus which is provided with two or more handsets and a common signalling unit. The handsets and the signalling unit are selectively operable for multiline operation in a conference arrangement or independently of each other and on any of the telephone lines connected to the apparatus.

B. Description of the Prior Art

Many arrangements have been proposed by the prior art for selective operation of a telephone set in a multiline telephone system wherein the telephone set is equipped with various buttons or switching arrangements for selecting operation on a particular one of the multiple lines. Such multiline telephone sets are sometimes referred to as key telephone systems and commonly provide a button corresponding to each telephone line and a hold button. Such arrangements are described in U.S. Pat. Nos. 2,936,341 which issued to L. J. Greshel et al. on May 10, 1916; 2,769,035 which issued to L. W. Droel on Oct. 30, 1956; and 2,589,180 which issued to F. E. Wood et al. on Mar. 11, 1952.

Other arrangements of the prior art have utilized additional receivers or earphone portions with conventional telephone sets operating on a single telephone line. Arrangements of this type for long distance use and for people who are hard of hearing are shown in U.S. Pat. Nos. 1,239,702 which issued to R. Lagus on Sept. 11, 1917 and 923,603 which issued to W. H. Taylor on June 1, 1909.

Another arrangement utilizes two microphones connected into a single telephone line so that either or both microphones may be utilized to transmit on the single telephone line. An arrangement of this type is shown in U.S. Pat. No. 2,308,014 which issued to R. Lee on Jan. 12, 1943.

Telephone system arrangements of the prior art have also provided various conference systems wherein a number of subscribers are all connected to a common line. A control arrangement for a conference system is shown in U.S. Pat. No. 3,470,322 which issued to C. F. Rice et al. on Sept. 30. 1969 and includes a controlling telephone set which is switchable between the various subscriber lines to bring subscribers into a conference arrangement by making successive calls on the appropriate lines.

While the above-described arrangements of the prior art are generally suitable for their intended use, these arrangements all utilize conventional telephone apparatus with some additional elements or pushbuttons to operate on multiple line systems or in conference arrangements. However, these prior art arrangements do not provide for the independent usage by one or more subscribers of a telephone arrangement utilizing common signalling apparatus which is selectively operable on one line or a multiple number of lines. Further, none of the arrangements provide telephone apparatus with a common signalling unit and in a common housing which may be utilized for the purpose of selective multiline operation and conference arrangements desirable in many applications and locations such as in offices and in homes.

SUMMARY OF THE INVENTION

In accordance with the present invention it is a principal object to provide improved single line or multiline telephone apparatus that utilizes a common signalling unit and provides two or more handsets which are operable on a single telephone line or are independently and selectively connectable to operate on a number of telephone lines connected to the apparatus.

It is another object of the present invention to provide telephone apparatus having a common housing, common signalling circuitry and two or more handsets to allow two or more subscribers to enter conference arrangements.

It is another object of the present invention to provide subscriber station apparatus which allows two subscribers to utilize a single telephone unit to simultaneously and independently operate the apparatus on two telephone lines.

It is a further object of the present invention to provide telephone station apparatus whereby two subscribers may selectively control the apparatus to operate either in a conference arrangement or for simultaneous multiline operation.

Another object of the present invention is to provide telephone apparatus that utilizes common signalling equipment selectively switchable between two or more telephone lines and two or more handsets each independently switchable to any one of the telephone lines wherein the apparatus simultaneously allows the subscribers to be connected to the same telephone line while still providing an indication of an incoming call.

It is another object of the present invention to provide multiline station apparatus having a common signalling unit and two or more handsets wherein the handsets are selectively operable at a remote location from the station apparatus by interconnection at a remote location into a prewired jack assembly to allow independent conversations of the subscribers without disturbance.

These and other objects are efficiently achieved by providing telephone station apparatus utilizing a common signalling or dialing unit and two or more handsets which are operable on a single telephone line or are selectively and independently operable on a number of telephone lines to provide a conference connection on one of the several telephone lines or independent simultaneous communication on two or more separate telephone lines. The common signalling unit is selectively connectable to any of the telephone lines connected to the apparatus. The telephone station apparatus also monitors incoming calls regardless of the handset connections to allow the indication of an incoming call when the handsets are connected in a conference arrangement. The handsets are connected to the telephone apparatus by means of a telephone plug and jack arrangement and may be operated on any of the telephone lines from locations remote from the station apparatus by the connection of the handset into a jack at the remote location that is wired into the station apparatus.

BRIEF DESCRIPTION OF THE DRAWINGS

The invention both as to organization and method of operation, together with further objects and advantages thereof, will best be understood by reference to the following detailed description taken in connection with the accompanying drawings, wherein:

FIG. 1 is a perspective view of the subscriber station telephone apparatus of the present invention;

FIG. 2 is an electrical schematic drawing of the subscriber station telephone apparatus of FIG. 1 for operation on two or more telephone lines; and FIG. 3 is an electrical schematic drawing of the subscriber station telephone apparatus of FIG. 1 for operation on a single telephone line.

DESCRIPTION OF THE PREFERRED EMBODIMENT

The telephone apparatus of the present invention, referring to FIG. 1, is referred to generally at 10 and includes a rectangular molded base portion 12 having a central raised portion 14 on which line selection and signalling controls are located for multiline apparatus. On either side of the raised central portion 14, two handsets 16 and 18 in a specific embodiment are carried by and interfit with portions of the base 12. The base 12 may further include a contoured molded surface in the vicinity of the handsets 16 and 18 to form a retaining cradle structure to interfit with the contours of the handsets 16 and 18. The cradle retaining structure is also provided with conventionally operated hookswitch controls for each of the handsets in multiline arrangements and for one of the handsets in a single line arrangement. The remaining hookswitch controls in a single line apparatus control the audio path to respective handsets. An upstanding edgewall 20 is also provided around the periphery of the cradle retaining structures to aid in retaining the handsets in their at-rest position.

It should be understood that in specific embodiments more than two handsets may be provided around the central raised base portion especially where the number of telephone lines connect to the apparatus is large, for example, more than two or three lines.

The handsets 16 and 18 are connected to the base or housing 12 by conventional coiled telephone cords 22 and 24 respectively. One or both of the handsets 16 and 18 may be connected to the base portion 12 by means of a telephone plug at the end of the telephone cord into a mating telephone jack mounted in the housing 12 as will be explained in more detail hereinafter.

The signalling arrangement, referred to generally at 26, includes a standard pushbutton signalling array in accordance with conventional telephone practices which is a four row by three column matrix array. It should be understood however that the present invention in various alternate arrangements contemplates the use of a rotary dialing mechanism or other telephone signalling arrangements.

The signalling arrangement of the pushbutton key array 26, referring now to FIG. 2, is operably connected into a signalling unit 28 which is effective to produce output signalling in the DTMF (Dual Tone Multifrequency) tone signalling format or in the case of a rotary dial produces the correct make and break ratio dial pulses. The signalling unit 28 may produce output tones by either conventional oscillator circuitry or by conventional integrated circuit tone generation techniques.

In accordance with important aspects of the present invention concerning multiline apparatus, selection arrangements are provided for each of the handsets 16 and 18 and also for the common signalling unit 28. Specifically, a selection arrangement 30 is provided for the handset 16, referred to as handset "A", by the provision of two pushbuttons bearing the indicia 1 and 2 respectively for a two line arrangement. Operation on either of two telephone communication lines is selected by the depression of the corresponding "one" button 32 or the "two" button 34. Additional pushbuttons are provided corresponding to the number of telephone lines to be connected for apparatus utilizing more than two lines.

The pushbuttons 32 and 34 are interrelated mechanically in a specific embodiment so that actuation of one, button 32, for example, deactuates or raises the paired button 34. In this manner, the pushbuttons 32 and 34 forming the selection arrangement 30 are effective to each operate a respective double pole-single throw switch or in combination form a double pole-double throw switch arrangement referred to generally at 36 in FIG. 2.

Of course, it should also be understood that in alternative embodiments the selection arrangement 30 may be provided by a two position rotary switch for a two line arrangement rotatable to a first detented position corresponding to operation on a first telephone line one and in a second position corresponding to operation on a second telephone line two. In that alternative embodiment, the selection arrangement 30 would directly operate a two layer-two position or double pole-double throw switch such as the arrangement 36.

In any event, the selection arrangement 30 controls the operation of the "A" handset 16 on one of two telephone lines for a two line arrangement referred to as line one and line two respectively in FIG. 2. A similar selection arrangement 38 is provided on the raised base portion 14 adjacent to and controlling the operation of the handset 18, referred to as the "B" handset, and is connected to operate a double pole-double throw switching arrangement 40 similar to the arrangement 36.

A selection arrangement 42 is also provided on the raised central portion 14 to control the operation of the signalling unit 28 to produce output signalling selectively on either telephone line one or line two for a two line arrangement. The arrangement 42, similarly to the arrangements 30 and 38, is provided by two interconnected pushbuttons labeled "A" and "B" respectively or by a two-position rotary switch in an alternate embodiment. The "A" or left pushbutton connects the signalling unit 28 to operate on the line connected to the "A" handset 16 and the "B" or right pushbutton operates the signalling unit on the line connected to the "B" handset 18. The selection arrangement 42 operates a double pole-double throw switch configuration 44 similar to the switches 36 and 40 discussed hereinbefore. As discussed hereinbefore, a pushbutton is provided corresponding to each line connected to the apparatus for multiline apparatus.

For a single line apparatus, the handset selection arrangements 30 and 38 as well as the signalling selection arrangement 42 are not provided as will be described in more detail hereinafter. Further, only one of the hookswitch controls in a single line apparatus controls the line condition with the remaining hookswitch controls enabling and disabling the audio paths to the respective handsets.

Considering now the detailed structure and operation of the telephone apparatus 10 for a multiline apparatus utilizing two lines as a convenient specific example and referring to FIG. 2, a telephone communication line pair referred to as line one and including a Tip lead 50 and a Ring lead 52 is connected internally of the housing 12 to a suitable terminal block or other connection means. A second telephone communication line pair referred to as line two and including a Tip lead 54 and a Ring lead 56 is similarly connected. The telephone communication line pairs, line one and line two, connect the telephone apparatus 10 to a switching network such as a central office or a PABX.

A first ringer device 58 is connected across the Tip and Ring leads 50 and 52 respectively of line one and a second ringer device 60 is similarly connected across the Tip and Ring leads 54 and 56 respectively of line two to indicate to the telephone subscribers whenever incoming calls are received. The ringer devices 58 and 60 may include active elements or ringers which produce different frequencies or tone qualities to distinguish incoming calls on the two lines.

In alternative arrangements the ringer devices 58 and 60 may include active electronic circuits which produce electronic ringing indications or other sounds. Provisions may also be made to visually indicate which of the telephone lines one and two is receiving incoming calls by mounting indicators on the raised line selection and signalling control portion 14.

The Tip lead 50 of telephone line one is connected to the one position contact of one pole of each of the double pole-double throw switch configurations 36 and 40. Similarly the Ring lead 52 of line one is connected to the one position contact of the other pole of each of the switch arrangements 36 and 40. Similarly, the Tip and Ring leads 54 and 56 of the second telephone line two are connected to respective poles of the second position contacts of the switching arrangements 36 and 40.

The center or common contacts of the switch configuration 36 are connected to a network "A" stage 62 which includes conventional telephone circuit arrangements such as a protective network, transmission network, balancing and impedance matching stage, the hookswitch control and other conventional circuitry found in telephone sets.

The network "A" stage 62 is operatively connected to the "A" handset 16 by the multiconductor telephone cord 22 and is effective to transmit and receive information on line one and line two according to the switch arrangement 36 being in either the one or two position.

Similarly, the center or common contacts of both poles of the switch configuration 40 are connected to a network "B" stage 64 which is similar to network "A" stage 62 and is connected to the "B" handset 18 through the multiconductor telephone cable or cord 24. The network "B" stage 64 controls the transmitting and receiving of information on line one and line two according to the switch configuration 40 being in the one or two position.

The signalling unit 28 produces output signalling on two output leads 66 and 68 which are connected to a first and second pole center contact respectively of the double pole-double throw switch configuration 44 controlled by the selection arrangement 42. The "A" position contacts of the switch configuration 44 are connected to the network "A" stage 62 to control output signalling by the signalling unit 28 through the network "A" stage 62 and out onto either line one or line two as determined by the selection arrangement 30 and switch 36 associated with the "A" handset 16.

Of course, it should be understood that the "A" handset 16 and the "B" handset 18 may also be referred to as left and right from the front of the unit 10 or by any other suitable designation.

Similarly, the "B" position contacts of both poles of the switch configuration 44 are connected to the network "B" stage 64 so that output signalling from the signalling unit 28 is transmitted onto either line one or line two as determined by the selection arrangement 38 and the switch configuration 40 being in either the line one or line two position respectively.

Thus, a person wishing to make an outgoing call selects a handset which is not being used, actuates the signalling selection button of selection arrangement 42 corresponding to the handset selected by the subscriber, and selects an idle line on either of the selection arrangements 30 or 38 depending on which respective handset "A" or "B" has been selected.

Alternatively, the signalling unit 28 may be connected directly through a switch arrangement similar to 44 to line one and line two. In that case, the signalling unit selection arrangement 42 would correspond to the selection of a telephone line, line one or line two, on which it is desired to signal rather than the selection of a particular handset "A" or "B".

In accordance with further important aspects of the present invention, one or both of the handsets, for example the "A" handset 16, may be connected to the base portion 12 of the telephone apparatus 10 through a telephone plug 80 connected at the end of the telephone line cord 22. The telephone plug 80 is connectable into a mating telephone jack 82 mounted in the base housing with the jack 82 being connected to the network "A" stage 62.

If two subscribers are carrying on two independent conversations on the telephone lines one and two, it is important that the two subscribers do not interfere or disturb each other. In addition to the two subscribers being able to separate themselves by the distance of the two phone cords 22 and 24, one of the subscribers may conduct his conversation or telephone call from another room by disconnecting the handset 16 and reconnecting the handset at another location or in another room which is provided with a mating telephone jack 84. The telephone jacks 82 and 84 in a specific embodiment are arranged and the jack 82 may incorporate contacts to allow the connecting of the jack 84 to the network 62 automatically and only upon the disconnection of the plug 80 from the jack 82.

In this event, it may also be desirable to incorporate a conventional hold or termination circuit into the network "A" stage 62 with suitable selective control on the raised central portion or panel 14 to allow the subscriber to initiate a call from the vicinity of the telephone apparatus 10, disconnect the handset 16 after placing the unit on hold, and connecting the handset 16 into the prewired jack in another room to continue the conversation.

Further, an automatic hold circuit may be provided in the network "A" stage 62 so that after a call is initiated that particular line is automatically put on hold. The hold termination is removed when the subscriber reconnects the handset 16 at another location. Of course it should be understood that a subscriber may also initiate a telephone call after connecting the handset 16 into a remotely located telephone jack 84 and then return to the remote location to continue the call. Further, in the case of an incoming call, the subscriber may answer the telephone call at the remote location either directly if the selection arrangement 30 is actuated on the proper line or indirectly after actuating the correct button.

In accordance with yet further important aspects of the present invention, in operation the telephone apparatus 10 may be utilized by two subscribers in a conference arrangement or to carry on two independent telephone conversations of either the incoming or outgoing type by the use of the selection arrangements 30 and 38, the two handsets 16 and 18, the common signalling unit 28 including the signalling arrangement 26 and the signalling selection arrangement 42.

The two independent telephone conversations, one on telephone line one and one on line two may of course both be incoming (subscriber-called party) or both be outgoing (subscriber-calling party) or any combination thereof due to the provision of the two ringer devices 58 and 60 and the common signalling unit 28 which is capable of selective signalling on either line one or line two.

In the case of two subscribers who wish to converse on the same telephone line with a third distant party or parties, typically referred to as a conference arrangement, the line selection arrangements 30 and 38 may both be actuated to the same telephone line, either line one or line two. Thus, the two handsets 16 and 18 are both connected through their respective network stages 62 and 64 to the same telephone line establishing a conference connection.

If an incoming call is detected during the conference arrangement by the activation of the ringer device on the line not being utilized, either of the subscribers may answer the incoming call by actuating one of the selection arrangements 30 or 38. Thereafter, both subscribers may selectively converse with and control the incoming call, the previous conference arrangement or initiate an independent call after terminating the incoming call by control of the selection arrangements 30 and 38.

It is contemplated by the present invention that a hold key or button and corresponding hold line terminations may be provided for each of the selection arrangements. In this manner, each of the subscribers may switch back and forth to form conference arrangements or independent conversations on either line. It is also contemplated in the use of the present invention that a single subscriber may carry on two conversations with the two handsets 16 and 18 on telephone lines one and two either simultaneously or with the addition of the hold buttons.

It should also be understood that the line selection arrangements 30 and 38 for each of the handsets may be further interrelated with each other so that the actuation of one to a first line deactuates the other selection arrangement from that first line and connects the second handset to the second line.

For example, as line one is selected on the arrangement 30 for the "A" handset by pushing the "1" button 32, the selection arrangement 38 for the "B" handset if previously left in the 1 position would be deactuated from line one and connected to line two preparing the telephone apparatus 10 for independent use on line two with the "B" handset. This arrangement would prevent inadvertent interruptions to a first conversation when a second subscriber arrives at a later time and initiates an independent telephone call. For this purpose, an additional conference selection arrangement similar to the arrangement 30 and associated switch configuration 36 may be provided to override the interrelated selection arrangement to establish conference calls on either of the two lines. In normal operation, one of the handsets such as the "A" handset 16 may be normally associated with and operated primarily on line one and the "B" handset 18 associated with and primarily operated on line two for the convenience of the subscriber.

In accordance with further important aspects of the present invention and referring now to FIG. 3 wherein like reference numerals refer to similar portions of FIG. 2, a single line telephone apparatus 10 is illustrated as connected to a telephone communication line pair having a respective Tip lead 150 and a Ring lead 152. The single line arrangement provides a telephone unit in a common housing and having a common signalling unit while providing a conference arrangement for two or more subscribers.

The "A" handset 16 and the "B" handset 18 are respectively connected to a network "A" stage 162 and a network "B" stage 164. The network "B" stage 164 is identical to the stage 64 of FIG. 2. The network "A" stage 162 is also identical to the stage 62 except the hookswitch control device of the network stage 162 controls only the audio path to the handset 16 and does not perform the line control on-hook and off-hook functions.

The handset selection arrangements 30 and 38 as well as the signalling selection arrangement 42 are deleted for the single line apparatus of FIG. 3 and both networks 162 and 164 are connected to the Tip lead 150 and Ring lead 152. The signalling unit 28, identical to that of FIG. 2, is connected to the network "B" stage 164 to provide signalling on the telephone line pair 150 and 152. A ringer device 58, identical to the ringer device of FIG. 2, is also connected across the telephone line pair to indicate incoming calls.

The "B" handset 18 in combination with the network "B" stage 164 primarily controls the line operation of the apparatus 10 since the hookswitch control device of the network 164 controls the on-hook and off-hook state.

In operation of the single line arrangement, one subscriber using the "B" handset 18 may initiate outgong calls and answer incoming calls in a conventional manner. A second subscriber can selectively enter into a conference arrangement by the use of the "A" handset 16.

As in the multiline arrangement of FIG. 2, a telephone plug 80 is provided at the end of the telephone line cord 22 which is connectable into a mating telephone jack 82 mounted in the base housing. The jack 82 is connected to the network "A" stage 162. Thus, a subscriber may carry on a conference call arrangement at a more convenient remote location to that of the apparatus 10. This is accomplished as discussed hereinbefore by disconnecting the telephone plug 80 and reconnecting the "A" handset 16 at a more convenient remote location. The telephone plug 80 is connected into a remote prewired jack 84 which is wired to the network "A" stage 162. The subscriber at the remote location is now in a conference arrangement with a subscriber utilizing the "B" handset 18 and a party at the distant end of the line pair 150, 152.

In a specific embodiment, the "A" handset 16 may be connected into the network "B" stage 164 wherein the network "A" stage 162 is eliminated. In that case, the audio path hookswitch control device for the "A" handset 16 is also connected into the network "B" stage 164.

It should be understood that the single line and multiline arrangements of the present invention contemplate the use of various combinations of the number of handsets and the number of telephone line pair connections. Further, the number of remotely connectable handsets and line controlling handsets may also be varied.

While there has been illustrated and described several embodiments of the present invention, it will be apparent that various changes and modifications will occur to those skilled in the art. It is intended in the appended claims to cover all such claims and modifications as fall within the true spirit and scope of the present invention.

What is claimed is:

1. Telephone apparatus for connection to a plurality of telephone lines comprising:
   a base portion including at least two arrangements defining structures for accepting a telephone handset, and a hook switch control device for each handset accepting structure;
   at least two telephone handsets having transmitter and receiver elements and being positionable on said base portion handset accepting structures;
   means for producing output signalling on said plurality of telephone line connections; and
   selection means connected to said handsets and said output signalling means for controlling the operation of said handsets and said output signalling means on said plurality of telephone line connections, said selection control means comprising first handset selection means actuable in a plurality of selection conditions corresponding to the number of telephone connections for controlling the operation of a first of said handsets on each of said plurality of telephone line connections according to the selection condition actuated, second handset selection means actuable in a plurality of selection conditions corresponding to the number of telephone line connections for controlling the operation of a second of said handsets on each of said plurality of telephone line connections according to the selection condition actuated, and signalling selection means actuable in at least two selection conditions for controlling said output signalling means to operate on each of said plurality of telephone line connections according to the selection conditions actuated.

2. The telephone apparatus of claim 1 further comprising means connected to each of said telephone line connections for indicating an incoming call.

3. The telephone apparatus of claim 2 wherein one of said indicating means is connected to each of said telephone line connections.

4. The telephone apparatus of claim 3 wherein each of said indicating means is responsive to ringing signals on said respective telephone line connections.

5. The telephone apparatus of claim 4 wherein each of said indicating means operates in a distinctive mode for identifying which of said telephone line connections has a ringing signal thereon.

6. The telephone apparatus of claim 1 further comprising telephone set networks intermediate each of said handsets and the respective selection controlling means, said telephone set networks comprising hookswitch control circuitry and transmission circuitry.

7. The telephone apparatus of claim 6 wherein said first and second handset selection controlling means each comprise a switch arrangement including two poles and at least two positions, the number of positions on said switch arrangement being equal to the number of telephone line connections, each of said plurality of telephone line connections including a lead pair being connected across a respective contact position of each of said switch arrangements, the center contacts of said switch arrangements being connected to said respective handset telephone networks.

8. The telephone apparatus of claim 7 wherein said first and second handset selection controlling means each further comprise a pushbutton switch actuator for each switch position of said switch arrangement and controlling said switch arrangement.

9. The telephone apparatus of claim 7 wherein said switch arrangement is a rotary switch and said first and second handset selection controlling means each further comprise a rotary selector connected to operate said rotary switch having a detent position for each of said switch arrangement positions.

10. The telephone apparatus of claim 6 wherein said signalling selection controlling means comprises a signalling switch arrangement including a center position having a contact connection to said output signalling means and at least two positions each having respective contact connection to said handset telephone networks.

11. The telephone apparatus of claim 6 wherein said signalling selection controlling means comprises a signalling switch arrangement including a center position having contact connections to said output signalling means and at least two positions, the number of positions on said signalling switch arrangement being equal to the number of telephone line connections, each of said positions having contact connections to a respective one of said telephone line connections.

12. The telephone apparatus of claim 1 wherein at least one of said handsets is selectively connectable to said base portion.

13. The telephone apparatus of claim 12 wherein said handset includes a multiconductor cord and a first connector at the end of said cord, and said base portion includes a second connector adapted to interfit with said first connector for connecting said handset to said respective selection controlling means.

14. The telephone apparatus of claim 13 further comprising a connector located remotely from said base portion and connected to said respective selection controlling means, said selectively connectable handset being connectable into said arrangements. located connector for remote operation.

15. The telephone apparatus of claim 1 wherein said first and second handset selection controlling means are actuable to connect said handsets to any one of said telephone line connections simultaneously for conference call arrangements, 16. The telephone apparatus of claim 1 wherein said base portion further includes a control selection panel and said selection controlling means is positioned on and within said control selection panel.

17. The telephone apparatus of claim 16 wherein said control selection panel is centrally disposed on said base and raised relative to said base portion handset accepting structure.

18. Telephone apparatus for connection to a telephone line pair comprising:
   a base portion including at least two arrangements defining structures for accepting a telephone handset;
   at least two telephone handsets having transmitter and receiver elements and being positionable on said base portion handset accpeting structures;
   means for producing output signalling on said telephone line pair connection;

means connected to said telephone line connection for indicating an incoming call; and means connected between said telephone handsets and said telephone line pair connection for controlling the operation of said telephone handsets, said controlling means comprising hookswitch control means and transmission circuitry, said hookswitch control means comprising a hookswitch device for each of said handsets positioned on respective ones of said handset accepting structures, each of said hookswitch devices being effective to enable a respective one of said telephone handsets in a first actuated off-hook position and disabling said respective telephone handset in a second unactuated on-hook position, at least one of said hookswitch control devices controlling the on-hook and off-hook state of the telephone line pair connection.

19. The telephone apparatus of claim 18 wherein at least one of said handsets is selectively connectable to said base portion.

20. The telephone apparatus of claim 18 wherein said handset includes a multiconductor cord and a first connector at the end of said cord, and said base portion includes a second connector adapted to interfit with said first connector for connecting said handset to said handset controlling means.

21. The telephone apparatus of claim 20 further comprising a connector located remotely from said base portion and connected to said handset controlling means, said selectively connectable handset being connectable into said remotely located connector for remote operation.

22. The telephone apparatus of claim 18 wherein only one of said hookswitch control devices controls the on-hook and off-hook state of the telephone line pair connection.

23. The telephone apparatus of claim 18 wherein at least one of said hookswitch control devices does not control the on-hook and off-hook state of the telephone line pair connection.

* * * * *